United States Patent
Van Rooy et al.

(10) Patent No.: US 6,657,659 B1
(45) Date of Patent: Dec. 2, 2003

(54) FLICKER COMPENSATION FOR CAMERAS

(75) Inventors: Johannes H. J. M. Van Rooy, Breda (NL); Antonius G. Moelands, Breda (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/298,232

(22) Filed: Apr. 23, 1999

(30) Foreign Application Priority Data

Apr. 27, 1998 (EP) .............................. 98201333

(51) Int. Cl.$^7$ .............................. H04N 9/73; H04N 7/01
(52) U.S. Cl. .................. 348/226.1; 348/447; 348/910
(58) Field of Search .................. 348/226.1–229.1, 348/239, 220.1, 208, 447, 901, 910; 386/38

(56) References Cited

U.S. PATENT DOCUMENTS

| | | | | |
|---|---|---|---|---|
| 4,677,464 A | * | 6/1987 | Yamaji et al. | 348/493 |
| 4,992,855 A | * | 2/1991 | Takei | 348/226.1 |
| 5,038,205 A | * | 8/1991 | Kondo et al. | 348/225.1 |
| 5,239,368 A | * | 8/1993 | Suzuki et al. | 348/226.1 |
| 5,272,539 A | | 12/1993 | Kondo | 358/228 |
| 5,293,238 A | | 3/1994 | Nakano et al. | 348/226 |
| 5,313,277 A | * | 5/1994 | Suzuki | 348/226.1 |
| 5,319,449 A | * | 6/1994 | Saito et al. | 348/223.1 |
| 6,147,706 A | * | 11/2000 | Inuiya et al. | 348/226.1 |

FOREIGN PATENT DOCUMENTS

| | | | |
|---|---|---|---|
| EP | 0506031 A1 | 3/1992 | .......... H04N/5/217 |
| JP | 62-123880 A | 6/1987 | ............ H04N/5/30 |
| JP | 02-306777 A | * 12/1990 | ............ H04N/5/21 |
| JP | 03-073691 A | * 3/1991 | ............ H04N/9/04 |
| JP | 06-197267 A | * 7/1994 | .......... H04N/5/235 |

* cited by examiner

*Primary Examiner*—Andrew Christensen
*Assistant Examiner*—Nhan Tran
(74) *Attorney, Agent, or Firm*—Steven R. Biren

(57) ABSTRACT

In a method of compensating an image signal (10) having a field frequency of substantially N times a mains frequency, in which $N \geq 2$, for AC light source induced fluctuations, the image signal (10) and an average signal representing an average image signal content over a given time period are arithmetically processed (14,16–20,8) to obtain a corrected signal (9), in which at least N−1 differences between at least N−1 respective phases of the corrected signal (9) on the one hand, and a selected phase (ph2) other than the N−1 phases of the corrected signal (9), or an average over N fields of the image signal (10), on the other hand, are integrated (14,16), and in which at least N−1 integrated differences are processed (20) to obtain a correction factor for the image signal (10).

19 Claims, 1 Drawing Sheet

FLICKER COMPENSATION FOR CAMERAS

The invention relates to flicker compensation for cameras, more specifically to flicker compensation for high-speed cameras such as slow-motion cameras operating at an increased field frequency.

JP-A-62/123,880 discloses a fluorescent lamp flicker correction circuit for a solid-state television camera. The magnitude of video signals is adjusted to lower flicker of a fluorescent lamp when a CCD element is used by adjusting the gain of a gain control circuit automatically according to the magnitude of video signals of each field. More specifically, video signals applied to an input terminal are applied to the gain control circuit and at the same time sent to a switching circuit. There, signals of one field are portioned to three signal lines including respective low-pass filters having the same characteristic to obtain three equalized signals which are switched successively by a switch. At the same time, they are equalized by an equalizing circuit. A divider divides the output from the switch by the output of the equalizing circuit to obtain gain control signals for the gain control circuit.

U.S. Pat. No. 5,272,539 discloses another video camera with flicker cancellation. A flicker cancelling loop has a flicker detector and detects a flicker component level in the image pick-up signal and controls the gain of an AGC amplifier and/or an opening of an iris so that the flicker component level is cancelled.

U.S. Pat. No. 5,293,238 discloses a television camera in which flicker which occurs when the television camera images an object under illumination of a flickering light source, such a fluorescent lamp, is minimized without causing sensitivity of a photo-electric conversion element and hence the camera to be degraded under a non-flickering light source. The television camera includes an automatic iris control device, an automatic gain control circuit, a microcomputer, a photo-electric conversion element, and an integration circuit for integrating an output signal of the photo-electric conversion element for each field period. The microcomputer sets a signal a signal storage time of the photo-electric conversion element to a value by which flicker noise can be restricted when flicker is detected on the basis of a change of an output signal of the integration circuit, and sets it to another value when a change of light source is detected on the basis of a change of iris value and gain. The integration circuit functions to accumulate signal for every field period and to sample/hold the integrated signal. The determination of flicker can be done by storing the input signal from the integration circuit for at least 1 field period, sequentially comparing it with a stored input signal for an immediately preceding field, and checking regularity.

The light output of artificial lighting from AC power sources is not constant in time. Especially FL and HMI light sources have a strong AC component. The cycle time of this effect is 1/100 sec for 50 Hz power sources and 1/120 sec for 60 Hz power.

Modern CCD cameras have a controlled exposure time. To avoid beat frequencies in the exposed picture in artificial light situations the camera exposure time can be chosen to integrate exactly one cycle time of the artificial light source used.

The choice of 50 Hz field frequency in countries with 50 Hz mains supply and 60 Hz field frequency in countries with 60 Hz mains supply was also meant to avoid beat frequencies between AC power and cameras. Even with exposure control switched to nominal, interference of the AC mains frequency with the field frequency only results in a beat frequency in the video signal at low frequencies ($f_{mains} - f_{field}$).

The above-mentioned prior art does not address the specific problems associated with slow-motion cameras operating at a high speed. For slow-motion applications cameras are used with a field frequency higher than 50 or 60 Hz. Typically slow-motion cameras work at field frequencies N times higher than the broadcast field frequency, with N=3 as the most commonly used (150 or 180 fields/sec). The signal of such cameras can be recorded, and the sequence can be played back at the normal system speed of the broadcast system, resulting in a time expansion of N (=slow-motion).

The maximum exposure time of the camera is less than one cycle period of the artificial light, and each 2 periods of the light is sampled in N fields. This means that on light with strong AC content the occurrence of beat frequencies in the camera output signal will be unavoidable. The AC content of the light source is sampled in N phases, resulting in a repeating beat pattern over every N field periods. If the relationship between field frequency and mains frequency is exact, a fixed cycle is the result, otherwise phase shifts will cause the pattern to change slowly, as the phase of the field sampling with regard to the light is changed. The disturbance of the signal then can be characterized as a pattern over N fields, slowly changing in time. FIG. 1 illustrates this. The horizontal axis represents time T in seconds, while the vertical axis represents the amplitude A. In FIG. 1, curve 1 represents the light output of a 50 Hz AC light source, while the rectangularly shaped curve 2 represents the average of curve 1 over one field period of a high speed camera having a field frequency of about 3×50 Hz. The most annoying effect is the fast change from field to field. The slow change in mean video level and field pattern is secondary.

Present slow-motion cameras have no means to correct for the effects described.

It is, inter alia, an object of the invention to provide improved slow-motion cameras. To this end, a first aspect of the invention provides a method and a device as defined by claims 1 and 3. A second aspect of the invention provides a slow-motion camera as defined by claim 4. An advantageous embodiment is defined in dependent claim 2.

A primary aspect of the invention provides a method of compensating an image signal having a field frequency of substantially N times a mains frequency, in which N≧2, for AC light source induced fluctuations, the image signal and an average signal representing an average image signal content over a given time period are arithmetically processed to obtain a corrected signal, in which at least N−1 differences between at least N−1 respective phases of the corrected signal on the one hand, and a selected phase (ph2) other than the N−1 phases of the corrected signal, or an average over N fields of the image signal, on the other hand, are integrated, and in which at least N−1 integrated differences are processed to obtain a correction factor for the image signal.

These and other aspects of the invention will be apparent from and elucidated with reference to the embodiments described hereinafter.

To correct the fast flicker effect in the camera the following observations can be made:

a) The average scene content of the scene from field to field does not change much in a short time period, apart from effects from lighting that we want to compensate.
b) When the field frequency of the camera is close to N times the lighting frequency a constant or slowly changing nearly repeating beat pattern over N fields can be observed.
c) Fast changes in light can be compensated in the camera with gain in the camera or exposure time changes of the sensor.
d) Red, green and blue phosphors in light sources can have different time constants, so that the behavior in R,G and B in the camera can be different, resulting in colored flicker effects.

Observations a) and b) lead to the conclusion that an adaptive compensation system acting on the average video in at least N fields can be used to compensate for flicker. Observations c) and d) imply that separate corrections for red, green and blue are necessary, either by separately controlling the gain or by separately controlling exposure time of the sensors.

For clarity, the situation for N=3 is given, but this does not limit the application.

Figure 1:
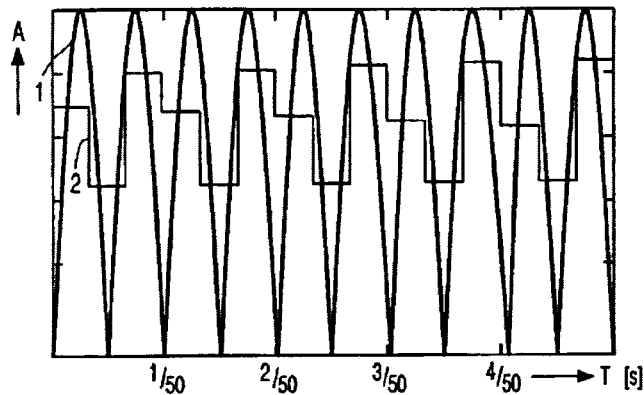
FIG. 1 illustrates the effects of an AC light source for a slow-motion camera.
Figure 2:
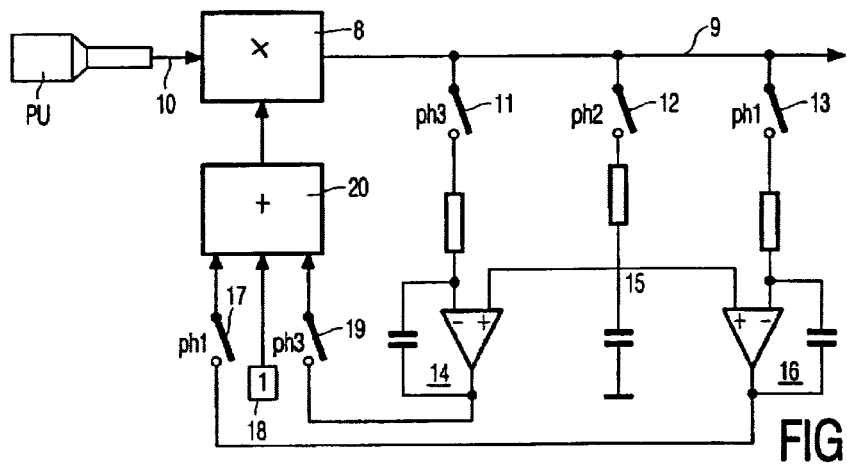
FIG. 2 shows a camera comprising a first embodiment of a correction circuit in accordance with the present invention.

FIG. 2 gives an embodiment of a camera including an analog realisation of a feedback type compensation. While the compensation path of only one color signal is shown, a complete camera will include three of such compensation paths, one for each color. The incoming color signal 10 from a pick-up unit PU is gain compensated by the signal multiplier 8. After the signal multiplier 8 the average color signal level of one (ph2) of the N phases ph1, ph2, ph3 is sampled by a switch 12 and a capacitor 15. For this phase ph2 the gain is set to one (18). N−1 control loops vary the gain for the other N−1 phases ph1, ph3 to get the same average color signal level in these phases. Each loop includes a switch 11,13, and an integrator 14,16 which integrates the difference between the average color signal level of that particular phase to the result of the reference phase stored by the capacitor 15. The combination of switches 11 and 19, and 13 and 17 switches the control signal per phase ph1, ph3 into the multiplier 8. The multiplier gain is the sum (calculated by an adder 20) of unity gain (18) and the output of integrator 16 if phase ph1 is processed, unity if phase ph2 is processed, and the sum of unity and the output of integrator 14 if phase ph3 is processed.

This processing uses no dividers (complex circuits, and very sensitive to offsets), and can be easily accomplished in analog hardware.

As one (ph2) of the N phases ph1–ph3 is used as a reference, and the N−1 others are compensated to give the same average color signal level, there is a disadvantage: the slow color signal changes when phase shifts occur, are not compensated, and for the relatively short temporal integration of only one field they can be quite strong.

Figure 3:
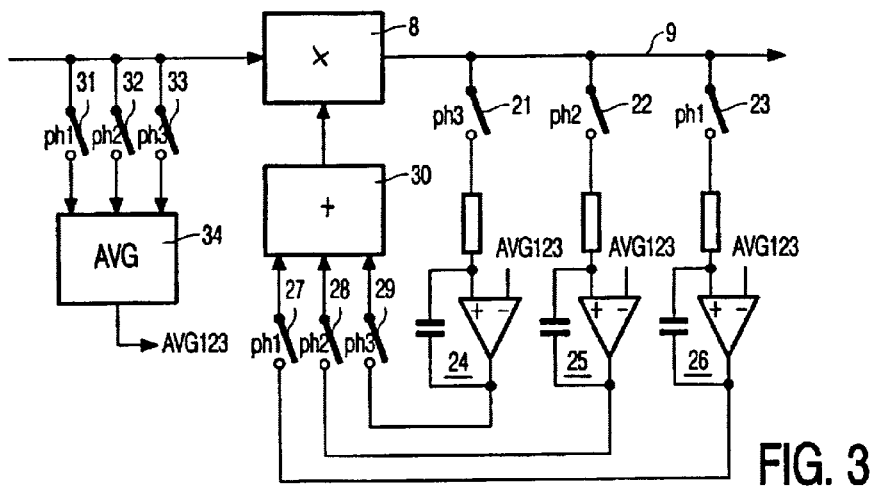
FIG. 3 shows a second embodiment of a correction circuit in accordance with the present invention.

FIG. 3 shows another embodiment using the average of N fields as a reference, to minimize the slow level changes. Basically the situation is the same as in the previous embodiment, but the reference signal for the integrators is derived as a moving average from N fields before the gain multiplier. The longer exposure time of this average signal, which spans more than one light cycle, diminishes the slow beat frequency in the corrected signal in comparison to the previous embodiemtn. An averager 34 obtains the average AVG123 over N fields of the input color signal 10 received thru N switches 31, 32, 33. In FIG. 3, all N phases of the color output signal 9 are integrated by integrators 24, 25, 26 which receive the color output signal 9 thru switches 21, 22, 23. The average AVG123 is input as a reference signal to all N integrators 24, 25, 26. Output signals of the N integrators 24, 25, 26 are applied to an adder 30 thru N switches 27, 28, 29, to obtain the control signal for the gain multiplier 8.

The required number N of phases in the control depends on the light frequency fL and the field frequency fF of the high-speed camera as follows:

$$N = fF/GCF(fL, fF),$$

in which GCF(fL, fF) is the greatest common divisor of fL and fF, and the light frequency fL is usually twice the mains frequency. The table below gives some examples.

| fF | fL | GCD (fF, fL) | N | application example |
|---|---|---|---|---|
| 300 | 120 | 60 | 5 | 300 Hz (5*60) slow-motion camera in 60 Hz country |
| 300 | 100 | 100 | 3 | 300 Hz (5*60) slow-motion camera in 50 Hz country |
| 250 | 120 | 10 | 12 | 250 Hz (5*50) slow-motion camera in 60 Hz country |
| 250 | 100 | 50 | 5 | 250 Hz (5*50) slow-motion camera in 50 Hz country |
| 180 | 120 | 60 | 3 | 180 Hz (3*60) slow-motion camera in 60 Hz country |
| 180 | 100 | 20 | 9 | 180 Hz (3*60) slow-motion camera in 50 Hz country |
| 150 | 120 | 30 | 5 | 150 Hz (3*50) slow-motion camera in 60 Hz country |
| 150 | 100 | 50 | 3 | 150 Hz (3*50) slow-motion camera in 50 Hz country |

Although the examples of realisation are rather specific digital or analog, compensations can be implemented as analog circuits, as digital circuits or algorithms in a microprocessor or digital signal processor (DSP). In the examples controlled gain is used to compensate the flicker, control of exposure time can also be used. As exposure time can only be shortened with regard to the nominal situation, the penalty is a decrease in sensitivity of the camera. When exposure time is used as a control, the gain circuit has to be replaced with a controlled timing device to individually control the start of the light integration of each of N fields within the sensor. From the examples in the table above it appears that the invention can even be applied in a slow-motion camera intended for the 50 Hz (or 60 Hz) market but used in a 60 Hz (or 50 Hz) country. That application is included within the scope of the claims.

A primary aspect of the invention can be summarized as follows. A video camera operating at a field frequency near a multiple N of the mains frequency with a control circuit to compensate for field flicker from lighting conditions, in which a compensation is derived from the average video content per field, and either N control loops to compensate individual fields in a cycle of N to an average video level, or N−1 loops to compensate N−1 fields to the average video level of the Nth field, in which N=3,4, etc.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A method of compensating an image signal having a field frequency of substantially N times a line frequency, in which N≧2, for AC light source-induced fluctuations, the method comprising the steps:

receiving said image signal having said field frequency of substantially N times a line frequency and being distorted by said AC light source-induced fluctuations;

generating an average signal representing an average image signal content over a given time period; and arithmetically processing said image signal and said average signal to obtain a corrected signal, wherein said arithmetically processing step includes the steps:

integrating at least N−1 differences between at least N−1 respective phases of said corrected signal, and a selected phase other than said N−1 phases of said corrected signal, or an average over N fields of said image signal; and processing at least N−1 integrated differences to obtain a correction factor for said image signal.

2. A method as claimed in claim 1, wherein said field frequency is substantially N times the line frequency, in which N≧2, and said arithmetically processing step includes the step of integrating N differences between N respective phases of said corrected signal and an average over N fields of said image signal.

3. A device for compensating an image signal having a field frequency of substantially N times a line frequency, in which N≧2, for AC light source-induced fluctuations, the device comprising:

means for receiving said image signal having said field frequency of substantially N times a line frequency and being distorted by said AC light source-induced fluctuations;

means for generating an average signal representing an average image signal content over a given time period; and means for arithmetically processing said image signal and said average signal to obtain a corrected signal, wherein said arithmetically processing means comprises:

means for integrating at least N−1 differences between at least N−1 respective phases of said corrected signal, and a selected phase other than said N−1 phases of said corrected signal, or an average over N fields of said image signal; and means for processing at least N−1 integrated differences to obtain a correction factor for said image signal.

4. A slow-motion camera, comprising:

an image signal pick-up unit operated at a field frequency of substantially N times a line frequency, in which N≧2, for generating an image signal; and a device for compensating said image signal for AC light source-induced fluctuations, as claimed in claim 3.

5. The compensating device as claimed in claim 3 wherein the integrating means integrates N differences between N respective phases of said corrected signal and an average over N fields of said image signal.

6. The compensating device as claimed in claim 5 wherein:

the integrating means includes op-amp means having first and second input means, the arithmetic processing means includes switching means for selectively supplying the corrected signal to the first input means of the op-amp means, and means for supplying the average over N fields of the image signal to the second input means of the op-amp means.

7. The compensating device as claimed in claim 5 wherein the receiving means comprises:

a gain-compensated multiplier having a first input that receives the image signal with AC light source-induced fluctuations and a second input that receives the image signal correction factor from the processing means.

8. The compensating device as claimed in claim 7 wherein the processing means comprises and an adder circuit that receives signals from output means of the integrating means.

9. The compensating device as claimed in claim 5 further comprising:

first switching means coupled between an output of the receiving means and an input of the integrating means, and second switching means coupled between an output of the integrating means and an input of the processing means.

10. The compensating device as claimed in claim 5 wherein the average signal generating means comprises:

an averager circuit having input means coupled to receive the image signal via switching means and output means coupled to input means of the integrating means.

11. The compensating device as claimed in claim 5 wherein the average signal generating means derives from the input image signal an average signal over N fields of the input image signal and which is supplied to input means of the integrating means as a reference signal, and the integrating means integrate all N phases of an output image signal.

12. A slow-motion camera as claimed in claim 4 where N=fF/GCF(fL,fF); and fF is the field frequency, fL is the line frequency, and GCF(fL,fF) is the greatest common devisor of fL and fF.

13. The compensating device as claimed in claim 3 wherein:

the integrating means integrate at least N−1 differences between at least N−1 respective phases of said corrected signal, and a selected phase other than said N−1 phases of said corrected signal, the selected phase of the corrected signal is derived by sampling, via a switch, the other one of the N−1 phases of the corrected signal and storing same in a storage element as a reference phase for the integrating means, and further comprising:

switching means for sampling the at least N−1 phases of the corrected signal and supplying same to the integrating means which integrates the differences between the N−1 phases of the corrected signal and the stored reference phrase.

14. The compensating device as claimed in claim 13 where N=3 and the storage element comprises a capacitor.

15. The compensating device as claimed in claim 13 wherein the receiving means comprises:

a gain-compensated multiplier having a first input that receives the image signal with AC light source-induced fluctuations and a second input that receives the image signal correction factor from the processing means, and the processing means comprises an adder circuit that receives signals from output means of the integrating means.

16. The compensating device as claimed in claim 13 further comprising:

first switching means coupled between an output of the receiving means and an input of the integrating means, and second switching means coupled between an output of the integrating means and an input of the processing means.

17. The compensating method as claimed in claim 1 wherein said arithmetic processing step further comprises varying the gain of the image signal by means of the correction factor so as to obtain the corrected signal.

18. The compensating method as claimed in claim 1 which further comprises:

selectively sampling at least N−1 respective phases of the corrected signal, sampling said selected phase of the corrected signal for use as a reference phase for the N−1 respective phases of the corrected signal, and switching results of the integrating step in relation to the selective sampling step.

19. The compensating device as claimed in claim 3 wherein:

the integrating means integrate at least N−1 differences between at least N−1 respective phases of the corrected signal, and a selected phase other than said N−1 phases of the corrected signal, the receiving means comprises:

a gain-compensated multiplier having a first input that receives the image signal with AC light source-induced fluctuations and a second input that receives the image signal correction factor from the processing means, and further comprising:

N−1 control loops that include the integrating means and the processing means.

* * * * *